J. D. TRACY & J. F. PLATT.
HARROW.
No. 178,566.  Patented June 13, 1876.
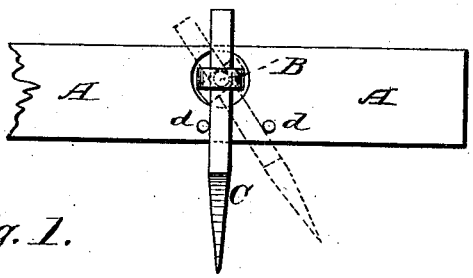
Fig. 1.
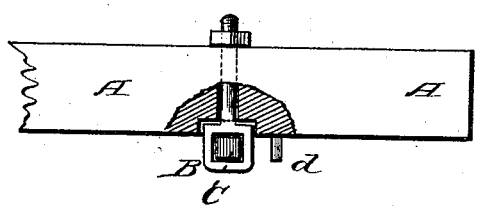
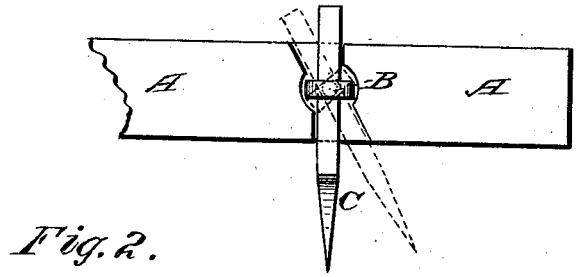
Fig. 2.
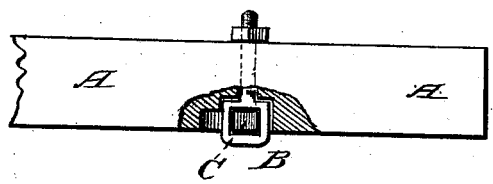
Witnesses:
P. C. Dieterich.
F. H. Duffy.
Inventors:
John D. Tracy
Jas. F. Platt
Per: John G. Manahan, Attorney.

UNITED STATES PATENT OFFICE.

JOHN D. TRACY AND JAMES F. PLATT, OF STERLING, ILLINOIS.

IMPROVEMENT IN HARROWS.

Specification forming part of Letters Patent No. 178,566, dated June 13, 1876; application filed March 4, 1876.

*To all whom it may concern:*

Be it known that we, JOHN D. TRACY and JAMES F. PLATT, of Sterling, in the county of Whitesides and State of Illinois, have invented certain new and useful Improvements in Harrows; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The object of our invention is to so hang or seat harrow-teeth as that when such harrow is drawn from one end the teeth may be arranged perpendicularly, and when drawn from the opposite end such teeth may be arranged with a uniform slant rearward.

Figure 1 is a side view of a section of harrow-beam, showing our mode of attaching the harrow-tooth. Fig. 2 is a modification of the same.

As our method of fastening the teeth is applicable to every harrow susceptible of being drawn from either end, thus including all square harrows, whether in sections or otherwise, and most, if not all, of the triangular harrows, we do not deem it necessary to show or describe more than the fastening of the tooth.

A is a section of a harrow-beam, having a hole passing laterally through it at about the lower line of the upper third of its depth. B is an eyebolt, through the eye of which the tooth C is passed. The bolt B has at its other end a thread and nut, by means of which the tooth C is firmly held against the side of the beam A. The stops *d d* are so placed relatively to the bolt B that when the tooth C rests against one stop the tooth will be perpendicular, and when resting against the other stop the tooth will be in such slant as may be desired. The stops *d d* may be dispensed with by cutting into the beam, as shown in Fig. 2, and countersinking the eye of the bolt B; but such method unavoidably weakens the harrow-beam; or the stops may be dispensed with by drawing the nuts sufficiently tight to hold the tooth.

The advantages of a harrow whose teeth may be readily convertible from the perpendicular to the oblique are sufficiently obvious to those conversant with the uses to which the harrow is now put—the one mode being adapted and used for heavy deep stirring, such as subduing rough or soddy ground and covering grain, and the other mode for light shallow stirring, such as covering grass-seed, smoothing the ground, or in the earliest stage of corn-cultivation.

We are aware that harrow-teeth have been hung on a pivot for the purpose of reaching the above-mentioned end; but from the fact that the constant jarring wore the point of suspension loose, and also wore away the sides, and also from the fact that, the dirt and rubbish working into the tooth-seat, the tooth being easily moved, the teeth were forced and held respectively in various positions, such modes were not satisfactory.

The advantage we claim for our invention is, first, that the beam is not weakened beyond the hole necessary for the eyebolt B; second, by means of the eyebolt B, the tooth C is so firmly held that there is no attrition, and no change of position of the tooth; and, third, our invention is applicable to the ordinary harrow-tooth—the latter a great desideratum.

In operation the bolt B is drawn sufficiently tight, so as to require a smart tap with a hammer or piece of wood to drive the teeth into the position then required, in which position the tooth will then remain until driven in like manner into the other position. The bolt E may be made in form like a staple passing horizontally through the beam, and having a thread and nuts on its inner ends, in which case it would be unnecessary to cut into the side of the beam.

We claim as our invention—

The eyebolt B, by which the harrow-tooth C may be held at any desired angle, in combination with the tooth C and beam A, substantially as described, and for the purpose mentioned.

In testimony that we claim the foregoing as our own we affix our signatures in presence of two witnesses.

JOHN D. TRACY.
JAMES F. PLATT.

Witnesses:
JOHN W. ALEXANDER,
CLARENCE L. SHELDON.